(12) United States Patent
Nass

(10) Patent No.: US 6,765,491 B1
(45) Date of Patent: Jul. 20, 2004

(54) DISTANCE DETECTING DEVICE

(75) Inventor: Thilo Nass, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/579,103

(22) Filed: May 25, 2000

(30) Foreign Application Priority Data

May 29, 1999 (DE) .......................................... 199 24 755

(51) Int. Cl.$^7$ .............................................. G08B 21/00
(52) U.S. Cl. ...................................... 340/686.6; 356/487
(58) Field of Search .......................... 340/539.13, 540, 340/552, 561, 686.5, 686.6, 686.1, 686.2; 356/5.07, 5.09, 349, 357, 484, 487, 498

(56) References Cited

U.S. PATENT DOCUMENTS

| 5,457,534 | A | * | 10/1995 | Lacey et al. ................. 356/507 |
| 5,793,487 | A | * | 8/1998 | Takahashi .................... 356/487 |
| 6,052,186 | A | * | 4/2000 | Tsai ........................... 356/484 |
| 6,133,993 | A | * | 10/2000 | Labaar ........................ 356/5.09 |
| 6,552,804 | B2 | * | 4/2003 | Hill ............................ 356/510 |

* cited by examiner

Primary Examiner—Van T. Trieu
(74) Attorney, Agent, or Firm—Michael J. Striker

(57) ABSTRACT

A distance detecting device for detecting a distance from objects with the use of wave signals determined by the distance measuring device and reflected from the objects, the distance detecting device comprising transmitter/receiver means for transmitting and receiving of wave signals with at least a first and a second transmitting/receiving unit which are spatially spaced from one another, with the first unit performing at least one transmitting functions and a second unit performing at least one receiving function, the both units being formed so that the second unit can receive wave signals emitted by the first unit as response signals, and either the function unit or the second unit can receive the wave signals emitted by the first unit as reflection signals, an interference determining device for determining at least one characteristic parameter of the response signal received in the second unit and for determining an interference based on the determined characteristic parameter.

7 Claims, 3 Drawing Sheets

DISTANCE DETECTING DEVICE

BACKGROUND OF THE INVENTION

The present invention relates to a distance detecting device for detecting a distance of objects with the help of wave signals which are emitted by an object detecting device and reflected from the objects.

While any distance detecting device can be used, the present invention as well as the problems on which it is based are illustrated with a distance detecting device arranged on a bumper of a motor vehicle and using ultrasound echos for distance detection.

In general distance detecting devices for contactless distance detection are known. They are used as parking assisting devices for motor vehicles, in particular a multi-channel measuring systems based on ultrasound. Such distance measurements are based on ultrasound measurements in accordance with the pulse-echo process and as a result have two sending-receiving devices integrated in the bumper of the motor vehicle. The distance measurement is performed by evaluation of the running time of direct echos (for example the transmitting time is simultaneously the receiving time) and the intercepting echos (for example a unit is the transmitting unit and one or several neighboring units are the receiving units).

An acoustic response of ultrasound signals along the bumper (body sound/air sound) is filtered for the evaluation of the signal, to exclude an exchange with actually available echo signals. In other words in the corresponding receiving characteristics, dead time windows are introduced in correspondence with the disturbance signals in which for a predetermined echo mode (for example a predetermined transmitter/receiver combination) no evaluation can take place.

A significant dirtying of the bumpers, for example by snow, ice, dirt, etc. and thereby of the vibration-sensitive membrane of the ultrasound transmitter or receiver increases blinding of the whole system, without however disadvantageously influencing the corresponding sensor individual characteristics.

Since the known systems are unreliable, there is a danger that the driver, in view of an increasing or already reached blinding of the whole system, will react too late or will not react at all.

SUMMARY OF THE INVENTION

Accordingly, it is an object of the present invention to provide a distance detecting device, which avoids the disadvantages of the prior art.

In keeping with these objects and with others which will become apparent hereinafter, one feature of present invention resides, briefly stated, in a distance detecting device which has transmitter/receiver means for transmitting and receiving wave signals with at least a first and a second transmitting/receiving unit which are spatially spaced from one another, with the first unit performing at least one transmitting functions and a second unit performing at least one receiving function; said both units being formed so that the second unit can receive wave signals emitted by the first unit as response signals, and either the first unit or the second unit can receive the wave signals emitted by the first unit as reflection signals; and an interference determining device for determining at least one characteristic parameter of the response signal received in the second unit and for determining an interference based on the determined characteristic parameter.

The distance detecting device in accordance with the present invention has an advantage as compared with known solutions, since it makes possible recognition of a strong dirtying of the membrane of the transmitting/receiving device at an early time and warning the driver properly about the blinding before a system failure.

The present invention operates so that the disturbance which is an undesired interference signal is provided for detection of the dirtying. In particular, the reduction of intensity of the disturbance with increased blinding, for example accumulation of snow, ice, dirt is utilized.

By a variation of characteristic parameter of for example acoustic signals, an interference can be determined. This usually undesirable additional affect (such signals must be filtered out in a normal operation to exclude an alternation of actual available echo signals) can be used here in order to increase the reliability of the system.

In accordance with a preferable embodiment of the present invention, the interference determination device is formed so that it determines the intensity or frequency of the disturbance signals received in the second unit. If it exceeds a predetermined threshold, then it is possible under certain considerations of the other units to derive an interference criterium participating in the total system. Then a simple interference criterium can be determined.

In accordance with another preferable embodiment of the present invention, for warning the user before a certain interference, a warning device is provided. The user can be informed for example by a visual or acoustic indicator that its system no longer operates reliably.

In accordance with a further preferable embodiment of present invention, the transmitting/receiving device has a third transmitting and/or receiving unit which is spaced from the first and second units spatially, with at least a transmitting function. The three units are defined so that the second unit can determine the wave signals emitted by the first and third units simultaneously as disturbance signals. In the simplest case the first and the third units have identical spacial distances from the second unit.

In accordance with a further preferable embodiment of the invention, the first and second units have different spacial distances from the second unit and a coordination device is provided which is formed so that it coordinates the transmitting functions of the first and third units in time, and the disturbance signals occur simultaneously in the second unit. Thereby an amplification of the disturbance signals and as a result an improved signals/noise ratio is provided.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
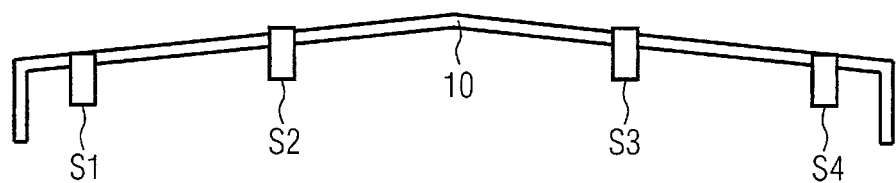
FIG. 1 is a view schematically showing a general construction of an ultrasound distance detecting device as an embodiment of the present invention.

In the drawings identical reference numerals identify identical or functionally similar components.

FIG. 1 schematically shows a general construction of an ultrasound distance detecting device, as one embodiment of the present invention. An ultrasound system shown in the drawings includes four transmitting/receiving units or sensors S1–S4. They are integrated in a bumper 10 of a motor vehicle.

For the sake of simplification the controlling and evaluating electronic components which are known in the prior art are not illustrated in the drawings.

Figure 2:
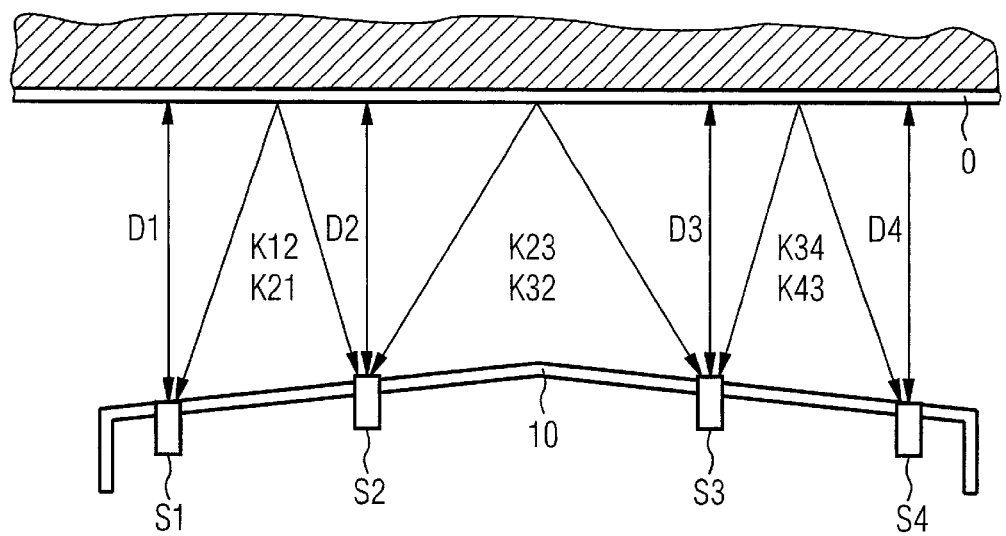
FIG. 2 is a view schematically showing the ultrasound distance detecting device of FIG. 1 in a normal measuring mode.

FIG. 2 is a schematic view showing the ultrasound distance detecting device of FIG. 1 in a normal measuring mode.

FIG. 2 shows the pulse-echo methods used in normal operational region, with direct echo Di, wherein i=1–4 and crossing echos Kij, wherein i, j=1–4. In the example the presumption is that all sensors S1, S2, S3, S4 have a transmitting and a receiving function. This is however not necessarily needed.

Figure 3:
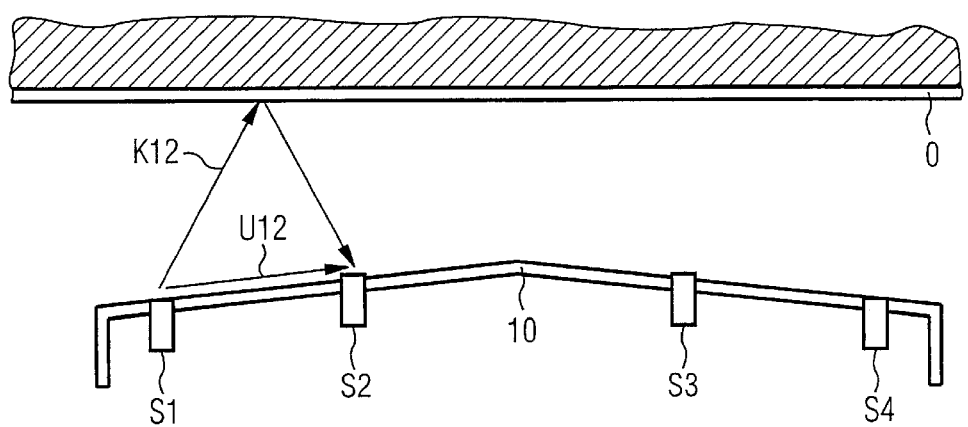
FIG. 3 is a view schematically showing the ultrasound distance detecting device of FIG. 1 in accordance with a first embodiment for a testing mode.

FIG. 3 shows a schematic illustration of the ultrasound distance detecting device of FIG. 1 in accordance with a first embodiment for a testing mode.

This example is illustrated in connection with the first and second sensors or the transmitting/receiving unit S1, S2.

The both units S1, S2 are arranged so that the second unit S2 can receive the wave signals emitted by the first unit S1 as disturbance signals U12 and as reflection signals, for example crossing echos K12.

Figure 5:
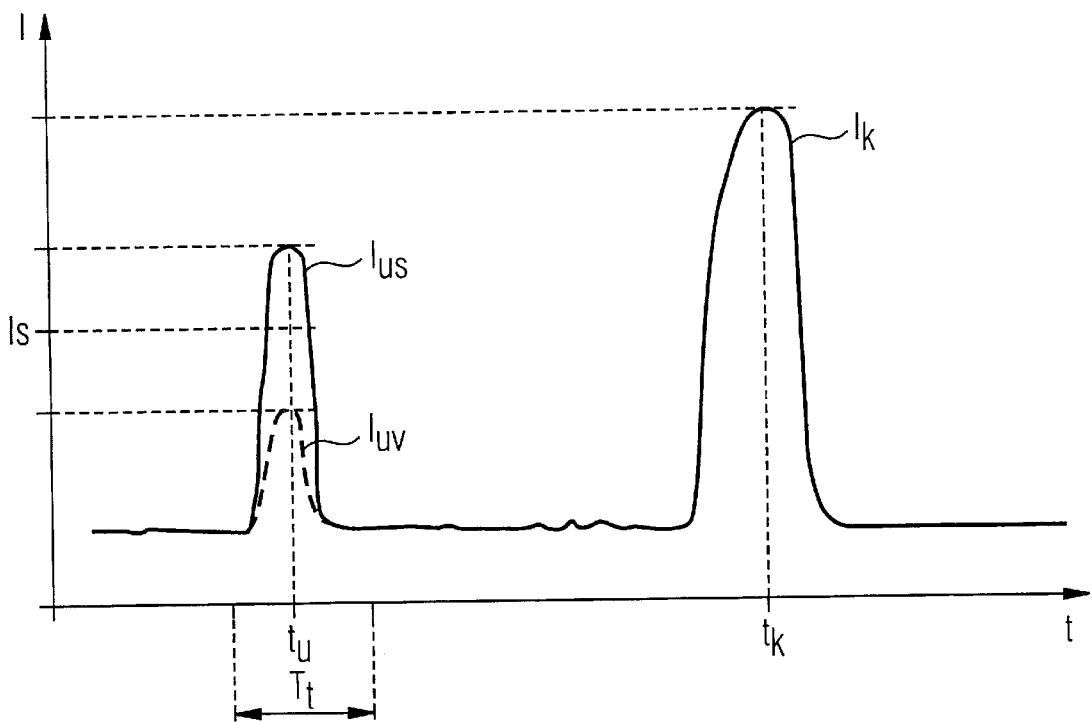
FIG. 5 is a view schematically showing an intensity/time diagram for echo signals of the ultrasound distance detecting device of FIG. 1 in a normal measuring mode and in a first testing mode.

FIG. 5 shows an intensity/time diagram for echo signals of this ultrasound distance detecting device in a normal measuring mode and in a first testing mode.

At time $t_u$, disturbance signals in the second sensor S2 are received and extracted through the dead time window $T_T$ in a normal measuring mode. In this normal measuring mode however the signals of the crossing echo K12 with the intensity $I_K$ at time $t_K$ is of interest, to detect the distance to the object 0 by triangulation.

In a first testing mode which is for example activated in predetermined intervals or during driving on free paths, it is determined whether the system is blinded or not.

For this purpose a not shown interference determining device in the determining system determines the intensity of the disturbance signal U12 at time $t_u$. The interference determining device is in this example formed so that it determines an interference, when then determined intensity exceeds a predetermined threshold here $I_s$. As an example for a non interference system in FIG. 5 the intensity $I_{us}$ is illustrated, and as an example for an interference system the intensity $I_{uv}$ is illustrated.

A further possibility is to distinguish between the intensity of the (echo) signals received by the sensor and the frequency of the (echo) signals further connected to the control device. An (echo) signal received by the sensor leads to a transfer to the control device only when a predetermined (analog) intensity threshold is exceeded, the evaluation is performed in the electronic system.

The threshold is adjusted fixedly in the sensor and independently from normal measuring or special testing mode. For the interference determination, in contrast, exclusively the frequency of the echo signals transmitted from the sensor (analog processing with subsequent analog/digital conversion) to the control device (purely digital processing) is important. An interference takes place when a predetermined frequency threshold is exceeded. In an advantageous manner, not only the third factor determined by an individual sensor, but also the combination of the results of several sensors are evaluated. The evaluation is performed in a software.

A warning device is provided inside the motor vehicle. It provides for the possibility of warning the user before a predetermined interference, for example by a red warning light.

Figure 4:
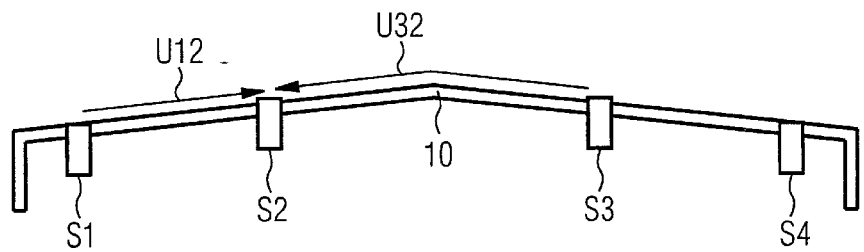
FIG. 4 is a view schematically showing the ultrasound distance detecting device of FIG. 1 in a second example for a testing mode.

FIG. 4 shows a schematic illustration of the ultrasound distance detecting device of FIG. 1 in a second embodiment for a testing mode.

In order to amplify the desired effect, for example the disturbance effect received in the sensor S2, in accordance with a second embodiment a special testing mode is used, in which the transmission pulses of the sensors S1 and S3 are generated so that by disturbance of the echos signals introduced in the receiving-sensor S2 they are amplified in their intensity. The transmitting pulses are determined in time so that they arrive substantially simultaneously at the receiving sensor, here the sensor S2.

The reliability of the inventive analysis of the disturbance can be further increased in that, transmitting signals emitted by several sensors, for example sensors S1 and S3 are coordinated in time in dependence on the corresponding sensor distances, so that they are received substantially at the same time in the reception sensor, here sensor S2.

Thereby both a weakening or obliteration of the pulse signals as well as an amplification can be obtained, and in dependence on a phase length of the opposite signal frequencies at the side of the sensor S2. Storastically or statistically provided, it is however often sufficient to have an amplification, and this effects results in relatively reliable disturbance determination in the reception sensor S2 with a very good signal/noise ratio.

The principle shown in FIGS. 3 and 4 can be correspondingly transmitted for the sensors S3 and S4 and eventually available for other sensors and simultaneously utilized there.

In laboratory assemblies and in real vehicles it can be for example proven that an acoustic response along the bumper in an operational temperature region of −40° C. to +80° C. occurs with assistance of the above described measuring principle in a sufficient way, as long as no significant dirtying occurs. When these signals do not appear over definite time interval, with sufficient reliability a system failure or a significant reduction of the system functional ability due to the blinding can be determined.

While the present invention is shown in a preferable embodiment, it is not limited to it, but instead many modifications are possible.

It is to be understood that the inventive operational principle can be used for the system with any number of sensors greater than one and not limited to the shown four sensors.

Instead of ultrasound, also microwaves or similar suitable radiations can be utilized. The invention can be actually transferred to all systems which have a time feedback to the individual components to be monitored.

It will be understood that each of the elements described above, or two or more together, may also find a useful application in other types of constructions differing from the types described above.

While the invention has been illustrated and described as embodied in distance detecting device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A distance detecting device for detecting a distance from objects with the use of wave signals determined by a distance measuring device and reflected from the objects, the distance detecting device comprising transmitter/receiver means for transmitting and receiving wave signals with at least a first and a second transmitting/receiving unit which are spatially spaced from one another, with the first unit performing at least one transmitting functions and a second unit performing at least one receiving function; said both units being formed so that the second unit can receive wave signals emitted by the first unit as response signals, and either the first unit or the second unit can receive the wave signals emitted by the first unit as reflection signals; and an interference determining device for determining at least one characteristic parameter of the response signal received in the second unit and for determining an interference based on the determined characteristic parameter.

2. A distance detecting device as defined in claim 1, wherein said interference determining device is formed so that it determines an intensity of a response signal received in said second unit and determines an interference when the determined intensity exceeds a predetermined threshold.

3. A distance detecting device as defined in claim 1, wherein said interference determining device is formed so that it determines a frequency of the disturbance signal received in said second unit and determines an interference when the determined frequency exceeds a predetermined threshold.

4. A distance detecting device as defined in claim 1; and further comprising a warning device for warning a user before a predetermined interference occurs.

5. A distance detecting device as defined in claim 1, wherein said transmitting/receiving device has a third transmitting and/or receiving unit which is spaced spatially from said first and second units and has at least a transmitting function, said three units being formed so that the second unit can receive wave signals emitted by said first and third units simultaneously as disturbance signals.

6. A distance detecting device as defined in claim 5, wherein said first and third units have different distances from said second unit; and further comprising a coordination device which is formed so that it coordinates the transmitting function of said first and third units in time, and the disturbance signals are received simultaneously by said second unit.

7. A distance detecting device as defined in claim 1, wherein the distance detecting device operates on wave signals of ultrasound waves.

* * * * *